June 10, 1969

C. R. WERNER 3,448,695

CAKE MAKING SYSTEM

Filed May 4, 1966

INVENTOR.
CHARLES R. WERNER
BY
ATTORNEYS

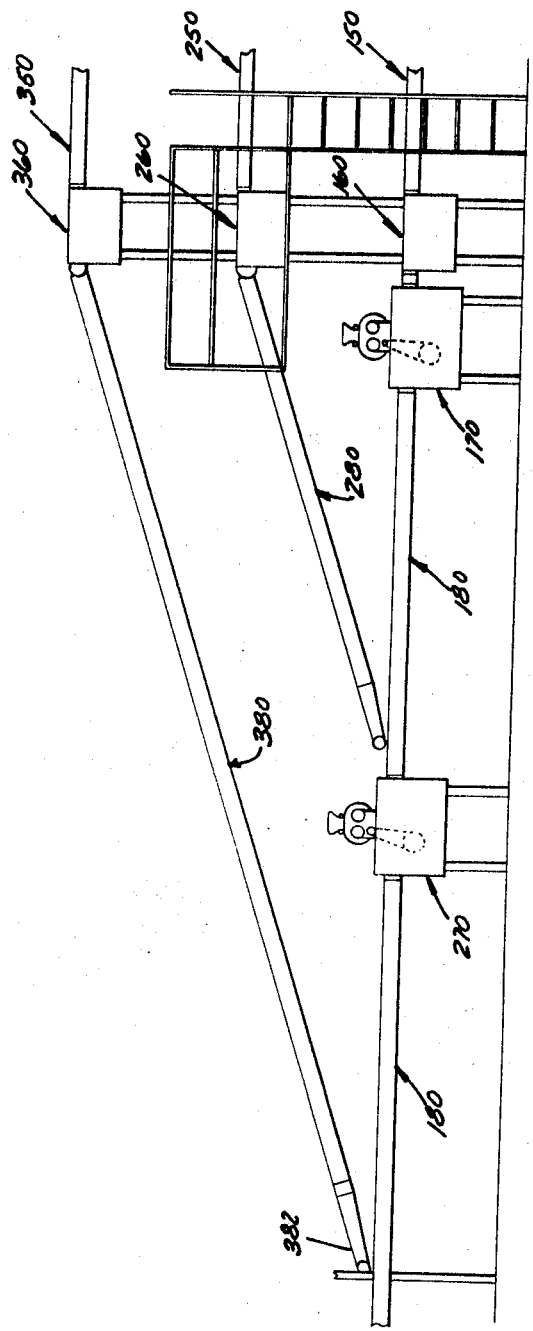

United States Patent Office 3,448,695
Patented June 10, 1969

3,448,695
CAKE MAKING SYSTEM
Charles R. Werner, Grand Rapids, Mich., assignor to Werner Machinery Co., Grand Rapids, Mich.
Filed May 4, 1966, Ser. No. 547,550
Int. Cl. A23g 3/02
U.S. Cl. 107—1          5 Claims

ABSTRACT OF THE DISCLOSURE

A cake making system for making a layer cake with filling therebetween, wherein a plurality of superimposed conveyor means are provided one stacked up above the other. Each conveyor means includes a baking section enclosed within an oven, a cooling section, and a stacking section. The batter is poured on each conveyor means and baked one above the other in the oven. Subsequently, it passes out of the oven through the cooling section to the stacking sections. The lower conveyor means is all located on substantially one plane. The upper conveyor means are parallel to each other throughout the baking and cooling sections. The upper stacking sections extend slantingly downwardly to the lowermost stacking section where the layers are stacked one above the other after the filling material is inserted therebetween. The entire layers of cake are supported by the conveyors during the entire operation until they are stacked one on the other after which they are sliced in both the transverse and longitudinal direction into the appropriate size cakes.

---

This invention relates to cake making systems and, more particularly, to an assembly line baking system for multi-layer cakes.

Prior art methods of baking multi-layer cakes and other types of multi-layer baked goods have necessitated always the sectionalized stacking of the individual layers by hand or some other type of machine. That is to say, that the cake which is often baked in continuous layer fashion must be cut up into discrete sections and these sections stacked on top of one another with layers of icing in between. On the other hand, the individual layers have not always been cut into packaging sizes prior to stacking. It has been rather customary to utilize individual sections which are large enough to yield two or three dozen cakes of suitable size for distribution.

Regardless, however, of the particular size of the sections which are utilized to form the layer cake the process necessitates the repeated handling of relatively small sections with a consequent reduction in efficiency of the overall baking operation. Additionally, the repeated handling of the relatively small sections of cake often causes them to crumble, resulting in a relatively non-uniform product and attendant loss in marketing appeal.

It is an object of this invention to provide a cake making system which represents a complete innovation in the art of baking multi-layer goods.

More particularly, it is an object of this invention to provide a cake making system which does not require sectionalizing of the separate layers prior to stacking them on top of one another.

It is an object of this invention to provide a cake making system capable of producing a continuous multi-layer cake which may, as a final step prior to packaging, be cut into discrete sections.

It is an object of this invention to provide a cake making system wherein the individual sections emerging for packaging will be uniform, thus adding to customer appeal for the product.

It is an object of this invention to provide a cake making system which operates with maximum efficiency, thus reducing the overall cost of the layer cake making operation.

These and other objects of this invention will be understood clearly by reference to the following specification and accompanying figures in which:

FIG. 3 is a fragmentary side-elevational view of the stacking section;

Briefly, the cake making system which is the subject of this invention comprises a plurality of tiered conveyor-type ovens, one such oven being provided for each layer of the product to be baked. Preferably, the ovens are of the type that are capable of producing the baked goods in an endless strip. As these endless strips emerge from the tiered ovens, they are routed onto individual cooling conveyors which, conveniently, also may be in tiered relationship with respect to one another. Means are provided along the cooling conveyors for compensating for the shrinkage of the goods as they cool.

Once the individual strips have been on the cooling conveyors for a sufficient period of time to cool those sections thereof most remote from the oven, the bottom layer is spread with a continuous layer of icing. The second layer, which has been riding along the conveyor assembly above the first layer, is brought into overlapping relationship with the first layer by means of a slanted conveyor belt. Icing is then applied to the top of the second layer. The process is repeated until such time as those portions of all the continuous strips of cake which are most remote from the oven have been placed in stacked relationship with icing between layers. At this time, and only at this time, the goods are sliced into individual sections suitable for packaging and marketing.

Figure 1:
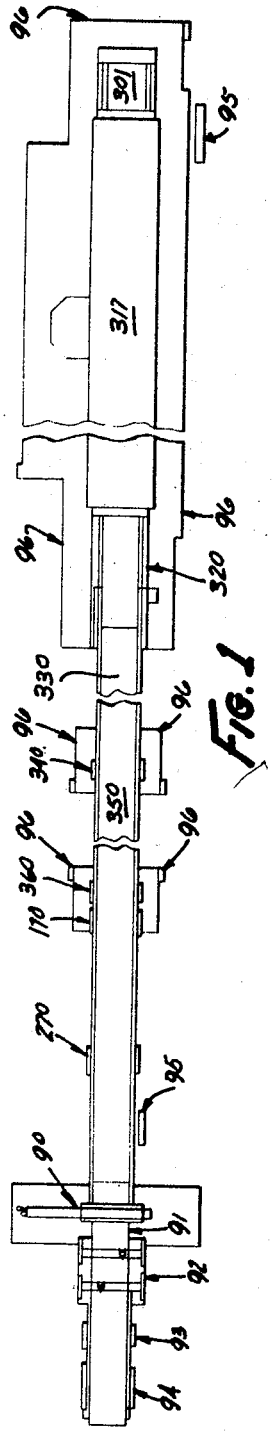
FIG. 1 is a broken plan view of the cake making system.
Figure 2:
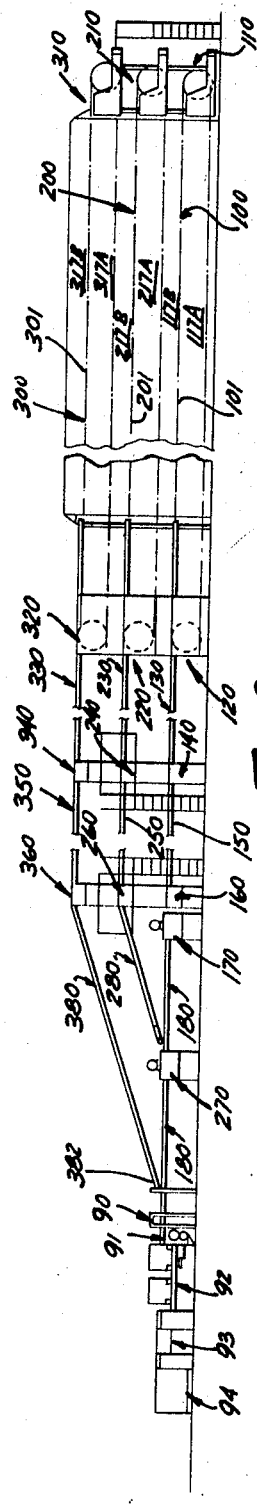
FIG. 2 is a broken side-elevational view of the cake making system which corresponds to that section shown in FIG. 1.

Referring now to the figures a preferred embodiment of this invention will be described in detail. FIGS. 1 and 2 show the complete assembly line which forms the subject of this invention. The batter is fed onto the assembly line at the extreme right as viewed in these figures and emerges in baked multi-layer sections suitable for packaging at the extreme left. For purposes of illustration, a three-layer assembly line has been chosen. It will be understood by those skilled in the art, however, that the teachings of this invention apply equally regardless of the number of layers which are being placed in mating relationship with respect to one another. The majority of the corresponding components along the tiered sections of the assembly line are identical. For ease of understanding, the reference numerals of these components have been prefaced by 1, 2 and 3 corresponding to the bottom, middle and top sections of the assembly line respectively.

Figure 4:
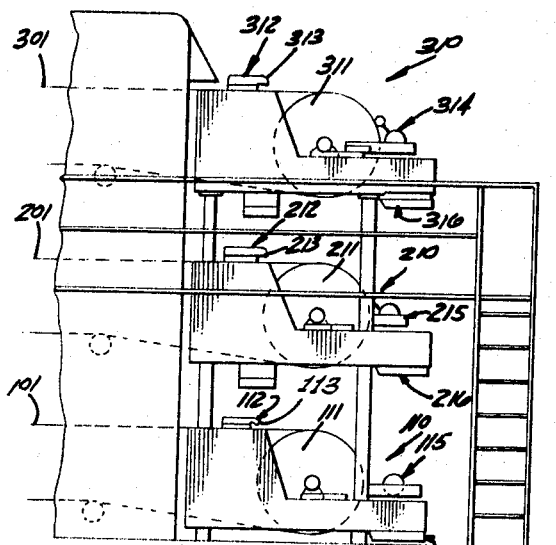
FIG. 4 is a fragmentary side-elevational view of the pouring section.

The reference numerals 100, 200 and 300 indicate the bottom, middle and top baking conveyor complexes. Each of these complexes has a conveyor band 101, 201 and 301 running therethrough. The pouring sections (see FIG. 4) of the respective conveyor complexes are indicated by the reference numerals 110, 210 and 310 and consist of idler rollers 111, 211 and 311 around which oven bands 101, 201 and 301 pass. Cake boxes 112, 212 and 312, each having an elongated orifice 113, 213 and 313 respectively, supply the batter to the upper surface of the oven bands in a well-known manner. The batter flow from the cake boxes is continuous during the time that the baking assembly is in operation. That is to say, that the individual layers are produced in endless fashion.

Conventional band wipers 115, 215 and 314 and band greasers 116, 216 and 316 are provided at the pouring sections of the respective layer complexes. As the batter is poured onto the conveyor band it is continuously transported into the oven enclosures 117, 217 and 317 for baking. In order that a more uniform and satisfactory product may be obtained, each of the oven enclosures is preferably divided into lower and upper baking sections designated as A and B, respectively, in the drawings (see FIG. 2).

Figure 5:
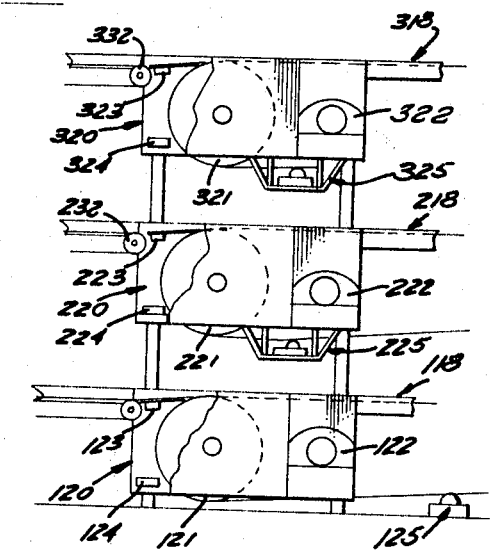
FIG. 5 is a fragmentary side-elevational view of the oven transfer station.

As the continuous layers emerge from their respective ovens, they pass onto discharge frames 118, 218 and 318 which are of conventional construction (see FIG. 5). A transfer stations, indicated by the reference numerals 120, 220 and 320, the goods are transferred from the baking conveyor complexes onto the cooling conveyor complex.

The details of transfer stations 120, 220 and 320 are shown in FIG. 5. Each has an oven band drive roller 121, 221 and 321 which is driven by a motor 122, 222, and 322 respectively. Conventional take-off knives 123, 223 and 323, band scrapers 124, 224 and 324 and band cleaners 125, 225 and 325 are provided within each of the transfer stations in the manner indicated. All of these devices are well known in the commercial baking art.

After leaving their respective oven conveyors, each of the continuous layers passes onto the first cooling conveyor complex which consists of three conventional cooling conveyors 130, 230 and 330 which have been stacked such that their heights correspond to the associated baking oven conveyor bands. Since these types of conveyors are well known in the art, it is not deemed necessary to discuss them in detail. Suffice it to say that each cooling conveyor has a mesh band which is rotatably mounted in endless fashion upon a series of suitable rollers carried by the frame. As the goods traverse these conveyors the surrounding air comes into contact with them causing cooling to a temperature suitable for stacking.

Figure 6:
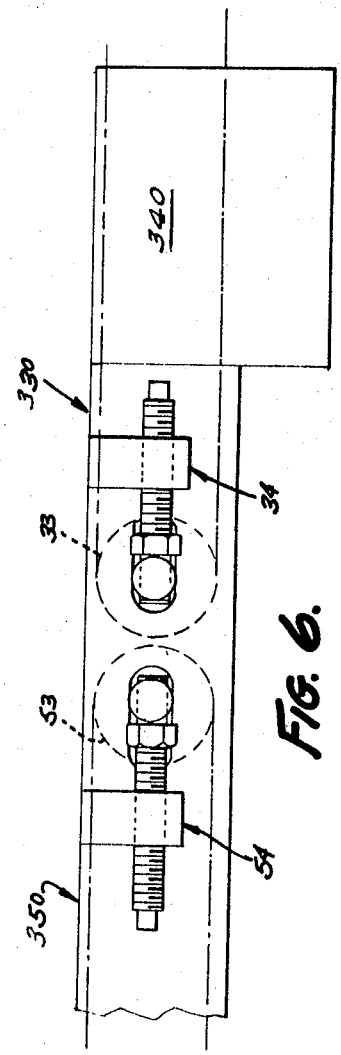
FIG. 6 is a fragmentary side-elevational view of a typical intermediate transfer station.

The baked goods tend to shrink during the cooling process. Where they are being baked in continuous strip fashion as in the present application, it is necessary to compensate for this shrinkage in some manner. Such compensation is made at shrinkage transfer stations 140, 240 and 340 for each of the individual continuous layers. These transfer stations consist merely of a break in the cooling conveyor bands. The continuous strips of baked goods are transferred from the first cooling conveyor complex to second cooling complex as indicated in FIG. 6. Suitable adjustment of the tension on the cooling conveyor bands and the proximity of the two rollers 33 and 53 may be adjusted by means of adjustment assemblies 34 and 54. Suitable motors and rollers are incorporated in transfer stations 140, 240 and 340 to power the first cooling conveyor complex.

The second cooling conveyor complex is driven at a slightly reduced rate of speed with respect to the first cooling conveyor complex. Thus, as the continuous strips of cake pass from cooling conveyors 130, 230 and 330 onto cooling conveyors 150, 250 and 350 the lineal rate of travel is reduced a sufficient amount to compensate for the accumulating shrinkage. The lengths of the cooling conveyor complexes are determined such that by the time individualized portions of the continuous layers reach drive stations 160, 260 and 360 they will be sufficiently cooled for the continuous stacking operation. These drive stations and the adjacent stacking complex are shown in FIG. 3.

A plurality of conventional creamers or spreaders 170 and 270 are utilized to apply the icing to the continuous layers as they pass their particular positions. While only two such creamers are shown in the drawings, it will be readily appreciated by those skilled in the art that an additional creamer could be utilized so that the top layer would also have frosting spread thereon. As the bottom continuous layer of cake reaches drive station 160 creamer 170 applies a continuous layer of frosting to its upper surface. As the middle continuous layer reaches drive station 260 it is routed onto a sloping stacking conveyor 280 which carries it in a converging manner towards conveyor 180. As the middle continuous layer of cake leaves stacking conveyor 280 it drops directly onto the bottom layer already on conveyor 180 in continuous fashion. At this point there are two stacked continuous layers of cake on conveyor belt 180. Conveyor belt 180 then passes below creamer 270 which applies a continuous layer of frosting to the upper surface of the middle layer of cake. As the top continuous layer of cake reaches drive station 360 it is routed in a conventional manner onto stacking conveyor 380 which also converges toward conveyor 180 at a point beyond creamer 270, and thus at a point where the bottom and middle continuous layers have already been stacked. As the top layer leaves conveyor 380 it falls in stacked relationship with respect to the bottom and middle layers in a manner identical to that described in relation to the stacking of the middle layer onto the bottom layer. Because of accumulating thickness differentials, stacking conveyor 380 may conveniently incorporate a swinging discharge section 382, the height of which may be controlled by any conventional means. Discharge section 382 of stacking conveyor 380 is vertically positioned in such a manner that the top continuous layer of cake stacks evenly and smoothly onto the middle layer.

As shown, stacking conveyor sections 180, 280 and 380 are merely extensions of cooling conveyors 150, 250 and 350 respectively. With such an arrangement drive stations 160, 260 and 360 may be utilized to power both the second cooling conveyor complex and the stacking conveyor complex. This arrangement has the additional advantage of enhancing the cooling process by utilization of the mesh-type conveyor until the stacking has been accomplished. It will be apparent, however that separate conveyor mechanisms could be utilized to perform these functions.

After the sections of the three continuous layers which are remote from the oven have been stacked they are continually fed into a slitter 90. Slitter 90 is of conventional construction. Slitter 90 slits the relatively wide continuous three layer cake into relatively narrow continuous strips. If necessary, the slitter may also be adjusted so as to trim the edges of the cake which may be discarded at a later point. After the relatively narrow endless strips emerge from slitter 90 they are transferred to belt 91 which carries them into operative relationship with cross cutter 92. Cross slicer 92 is of conventional construction. The cross cutter functions to slice the moving continuous strips of cake in a crosswise manner such that a product of convenient size for packaging and marketing is formed. Once the goods have been so sectioned, they pass onto transpositor 94 which is driven by drive 93. Transpositor 94 may be fabricated in accordance with the teaching of United States Patent No. 3,211,033.

In order to facilitate inspection and adjustment of the various components of the machine a plurality of catwalks 96 are provided at the various drive and transfer stations along the assembly line. Catwalks additionally extend along both sides of the oven for the entire length thereof. The entire assembly may be rigged for remote control in a well-known manner from control panels indicated generally by the reference numeral 95.

Operation

After the various driving components of the assembly line have been activated, and after the temperatures within the oven have been brought up to the desired level the cake boxes 112, 212 and 312 are activated and a continuous stream of batter begins to flow onto each of the oven bands 101, 201 and 301 from elongated orifices 113, 213 and 313. So long as the assembly line is running these streams of batter continue to flow at a rate governed by the speed of the conveyor bands within the oven. The batter placed on the bands passes into the associated oven enclosure and travels therethrough at such a speed that it is baked to the desired degree upon emerging at the opposite end.

The continuous strips of cake are removed from the oven bands by take-off knives 123, 223 and 323 and are transferred onto the cooling conveyors 130, 230 and 330 respectively for cooling. As the oven bands reverse their route towards the starting point they are scraped by band scrapers 124, 224 and 324 and further cleaned by cleaners 125, 225 and 325. Before more batter is placed on that particular section of the band, it is wiped and greased at the pouring sections 110, 210 and 310 in a conventional manner. The continuous or endless strips of cake pass along cooling conveyors 130, 230 and 330 until such time as they reach shrinkage transfer stations 140, 240 and 340. At this point, as noted previously, each of the layers is transferred to cooling conveyors 150, 250 and 350. Cooling conveyors 150, 250 and 350 run at a slightly reduced rate of speed with respect to cooling conveyors 130, 230 and 330. This reduced rate of speed compensates for the natural shrinkage which occurs in the endless layers during the cooling process.

As the bottom continuous layer of cake passes over drive station 160 spreader 170 spreads a continuous layer of frosting on the top thereof. As the middle continuous layer traveling on cooling conveyor 250 reaches drive station 260 it is routed onto stacking conveyor 280. The angle between conveyors 250 and 280 is sufficiently great to prevent the breaking of the cake as it turns the corner and starts its downward progression towards conveyor 180. As successive segments of the middle layer reach the lower extremity of stacking conveyor 280 they drop therefrom onto the top of the bottom layer which is already traveling along conveyor 180. The two continuous layers then pass beneath spreader 270 and a second layer of frosting is applied thereto. As successive segments of the top continuous layer reach drive station 360 they are routed onto stacking conveyor 380. Again, the angle between cooling conveyor 350 and stacking conveyor 380 is maintained sufficiently large to prevent breakage or crumbling of the cake as it begins its downward progression into mating relationship with the two previously stacked layers. As the successive segments reach the lower extremity 382 of stacking conveyor 380 they are sequentially dropped in continuous fashion onto the top of the middle layer. As variations in height are encountered the height of discharge section 382 of stacking conveyor 380 may be adjusted to compensate therefor by any conventional means such as an air cylinder (not shown). Thus, at that section of conveyor 180 which is to the left of discharge section 382 of stacking conveyor 380 as viewed in FIG. 3, a continuous three layer cake appears.

The continuous three layer cake is fed into slicer 90 which operates to slice the cake into a plurality of continuous strips of the desired packing width. Each of these strips continues along conveyor 91 and travels into operative relationship with cross slicer 92. Cross slicer 92 slices the continuous strips in crosswise fashion as they travel along the conveyor belt such that that section of conveyor belt 91 to the left of cross slicer 92 as viewed in FIG. 3 contains a plurality of sectioned three-layer cakes suitable for packaging and distribution. These cakes are transported onto transpositor 94 which transfers them onto the packaging line in row relationship.

At the time that goods are being transferred onto the packaging conveyor by transpositor 94, cake boxes 112, 212 and 312 continue to place batter onto the oven bands. Thus each of the layers is baked in continuous fashion and the layers are stacked prior to any cutting operation eliminating the necessity for handling separately a plurality of sections of cake. The assembly may remain activated until such time as it is desired to terminate it. Pouring sections 110, 210 and 310 are then deactivated and once the cake that is in the process of preparation has all been transferred to transpositor 94 the entire device may be deactivated.

The particular dimensions suitable for any particular assembly will, of course, depend upon the building measurements, the quantity of cake desired to be produced, the limitations of pre-existing equipment and a plurality of other factors. The cake may conveniently be produced in strips approximately four to five feet in width. The entire assembly may run from 250 to 300 feet. This length may be markedly reduced by utilizing conventional cooling tunnels wherein an artificial cooling atmosphere is maintained. Such tunnels permit cooling of the goods in a shorter distance.

I claim:
1. Apparatus for making multi-layered baked goods comprising:
   a plurality of conveyor means;
   an oven enclosure surrounding a section of each of said conveyor means;
   means for continuously pouring batter onto successive increments of each said section prior to its passage through said oven enclosure such that said batter emerges from said oven enclosure in a plurality of continuous baked layers;
   means for sequentially converging successive segments of said plurality of continuous baked layers in top to back relationship;
   means for cooling said continuous layers subsequent to their emergence from said oven enclosure but prior to their coming into contact with said sequential converging means; and
   said cooling means comprising a pair of aligned conveyors for each said continuous layer, the relative speed of said conveyors being such as to compensate for shrinkage of said layers as they are cooled.
2. Apparatus for making multi-layered cakes comprising:
   a plurality of superposed conveyor means each including a horizontal baking section for supporting batter to be baked thereon and a stacking section for superimposing the baked batter delivered from said baking sections, said baking sections including one lowermost baking section and at least one uppermost baking section spaced vertically above and parallel to the lowermost section, said stacking sections including a horizontal lowermost stacking section including an endless traveling surface extending from and located on substantially the same plane as said lowermost baking section and an uppermost stacking section including an endless traveling surface extending from and extending slantingly downwardly from said uppermost baking section to said lowermost stacking section;
   an oven enclosure surrounding the baking section of each of said conveyor means;
   means for continuously pouring batter onto successive increments of each of said horizontal baking sections prior to their passage through said oven enclosures such that said batter emerges from said oven enclosures in a plurality of continuous baked cake layers; and
   said stacking sections providing convergence of suc- cessive segments of said plurality of continuous baked layers in top to back relationship, the said baking and stacking sections coacting to support said cake layers substantially continuously until said layers are arranged back to top.

3. The apparatus as set forth in claim 2 which further comprises cooling conveyor sections located between said baking and converging sections providing means for cooling said continuous layers subsequent to their emergence from said oven enclosure but prior to their coming into contact with said sequential converging means.

4. The combination as set forth in claim 3 in which said cooling means comprises a pair of aligned conveyors for each said continuous layer, the relative speed of said conveyors being such as to compensate for shrinkage of said layers as they are cooled.

5. The apparatus as set forth in claim 2 which further comprises spreader means located at said converging sections for continuously applying spread to each said layer prior to the time that another layer is placed thereover.

References Cited

UNITED STATES PATENTS

| | | | |
|---|---|---|---|
| 2,660,961 | 12/1953 | Neutelings et al. | 107—1 |
| 2,678,614 | 5/1954 | Bahlsen | 107—57 |

FOREIGN PATENTS 242,123   11/1925   Great Britain.

WALTER A. SCHEEL, *Primary Examiner.*

JOSEPH SHEA, *Assistant Examiner.*

U.S. Cl. X.R.

107—4